United States Patent [19]

Smushkovich

[11] Patent Number: 4,641,063
[45] Date of Patent: Feb. 3, 1987

[54] VIDEO DRIVER LEVEL SHIFTER

[76] Inventor: Yosif Smushkovich, 1830 N. La Brea Ave. #2, Los Angeles, Calif. 90046

[21] Appl. No.: 807,324

[22] Filed: Dec. 10, 1985

[51] Int. Cl.[4] .................. H01J 29/52; H04N 5/57
[52] U.S. Cl. .................................. 315/383; 358/168
[58] Field of Search ................ 315/381, 383, 396; 358/39, 40, 168; 330/296

[56] References Cited

U.S. PATENT DOCUMENTS

| | | | |
|---|---|---|---|
| 4,096,517 | 6/1978 | Hinn | 330/296 |
| 4,270,126 | 5/1981 | Bafaro | 315/383 |
| 4,300,074 | 11/1981 | Diddens et al. | 315/383 |

*Primary Examiner*—Theodore M. Blum
*Assistant Examiner*—D. Cain
*Attorney, Agent, or Firm*—J. E. McTaggart

[57] ABSTRACT

For an ultra high resolution color picture tube display, a level-shifting circuit is interposed between each of the three video output amplifiers and the three picture tube cathodes receiving video drive. In the level-shifting circuit, d.c. control voltages from adjustment potentiometers are applied to a voltage-controlled current source which provides voltage-compliant control input to a current-controlled voltage source which provides the adjustable d.c. offset voltage interjected between each video output amplifier and a corresponding picture tube cathode, providing individual background adjustment and brightness tracking adjustment compensation for cutoff spreads between the three picture tube guns and providing user brightness control action all independent of operating bias point voltages in the video amplifiers, so that they can be design-optimized for maximum bandwidth to achieve ultra high resolution.

6 Claims, 2 Drawing Figures

VIDEO DRIVER LEVEL SHIFTER

FIELD OF THE INVENTION

This invention relates to electronic circuitry for supplying video signals to control elements of a cathode ray picture tube or other display device. More particularly this invention relates to circuit improvements, applicable to video output amplifiers driving color picture tubes, for increasing the video bandwidth to achieve unusually high resolution display performance.

DESCRIPTION OF PRIOR ART

Solid state video drivers for picture tubes usually employ transistorized video output amplifiers. The emerging need for higher resolution video and computer graphics displays has placed new and difficult demands on video output amplifiers and their transistors for greater bandwidth, while the development of the unitized gun in color picture tube technology has further burdened the video output amplifiers with additional performance demands which require sacrificing bandwidth and resolution in existing circuit implementations.

Video output amplifiers for lower resolution displays have usually employed a single high voltage bipolar silicon transistor in a common emitter configuration, driving a picture tube cathode from the transistor collector. Resolution depends on bandwidth. With no peaking compensation, the 3 dB bandwidth is 1/(2 RC) where R is the resistance of the output collector load and C is the total capacitance to ground at the collector, including the picture tube input capacitance. In seeking to increase bandwidth one must examine the basic R and C parameters. With good design practice, the capacitance C is already at an irreducible minimum. In attempting to reduce the load resistance R, the designer rapidly encounters limits imposed by the transistor's maximum current and power dissipation capabilities, and a search for a higher performance type video output transistor encounters insurmountable state-of-the-art limitations in achieving simultaneously the required gain, bandwidth, voltage rating, power dissipation and current capabilities.

For high resolution, extended bandwidth has been achieved in a more sophistocated video output amplifier having a cascode stage to minimize Miller effect due to collector-base capacitance in the gain transistor, and having a complementary symmetry output buffer stage which isolates the picture tube capacitance from the main amplifier collector node, and provides a low impedance emitter follower drive to the picture tube. Peaking techniques are well known and are usually employed in video amplifiers, however the available improvement is inherently limited to a factor of about 1.5 over the uncompensated 3 db bandwidth.

Cathode ray picture tubes are subject to a spread in cutoff voltage (G1 to K) from tube to tube, and also from gun to gun in three-gun color picture tubes. For color picture tubes having three independent guns, the G2 voltage was made adjustable independently for each gun to provide compensation for the cutoff spread between guns. With the advent of the unitized gun picture tube having common G1 and common G2 for all three guns, the cutoff became more uniform between the three guns; however, since the G2 voltages cannot be adjusted independently, compensating the remaining differences in individual gun cutoffs has become more difficult and has required the "brute force" approach of designing the video output amplifiers to provide cutoff compensation capability in the form of reserve dynamic range of output swing considerably greater than that required simply to modulate the picture tube beam current from cutoff (black) to maximum usable brightness level. In addition, brightness control is usually implemented by shifting the d.c. operating point of the video output stage(s), further aggravating the demands on the video output transistors.

Video output amplifier design considerations and picture tube drive requirements are detailed in an Application Note AN-761, "Video Amplifier Design: Known Your Picture Tube Requirements", by Motorola Semiconductor Products. The data developed shows that although typically a picture tube requires only 45 volts peak-to-peak video drive from cutoff to maximum usable instantaneous brightness, the video output driver for a unitized gun picture tube must be made capable of an additional 25 volts swing to allow for cutoff variations plus an additional 15 volts swing for brightness control: a total of 85 volts peak-to-peak swing.

To obtain maximum resolution and bandwidth, even the more sophistocated video output amplifiers must be carefully optimized for the amount of output swing required, and even with optimal power supply voltages and best available transistor types specified with optimal parameters different for each of the four transistors in the amplifier, and optimal peaking, the maximum bandwidth attainable is limited to about 60 MHz when the aforementioned reserve drive capability is provided for picture tube cutoff compensation and brightness control purposes. Since this reserve drive required trading off bandwidth in the design it becomes apparent that if the video amplifier could be relieved of the burden of providing the reserve drive, then its design could be reoptimized for a substantial increase in bandwidth to about 120 MHz, for a corresponding improvement in resolution.

It is a primary object of this invention to improve the resolution of a color picture tube display by providing circuitry for interjecting an independently adjustable d.c. offset voltage between the output of each video driver amplifier and its corresponding picture tube cathode for compensating the cutoff spread between guns and for providing brightness control cpability, thus minimizing the dynamic range demanded of the driver amplifier so that it can be optimally designed for wider bandwidth to produce a display of higher resolution than has been heretofore available with conventional video output circuitry.

SUMMARY OF THE INVENTION

The primary object of this invention has been accomplished by introducing an active dynamic d.c.-controlled d.c. level-shifting circuit connected between each video output amplifier and its corresponding cathode in a color picture tube, thus providing the capability of adjusting d.c. bias voltages of the picture tube without affecting the d.c. bias voltages of the video output amplifiers, and thus allowing the amplifiers to be optimally designed for wide bandwidth to achieve a high resolution display.

DETAILED DESCRIPTION

Figure 1:
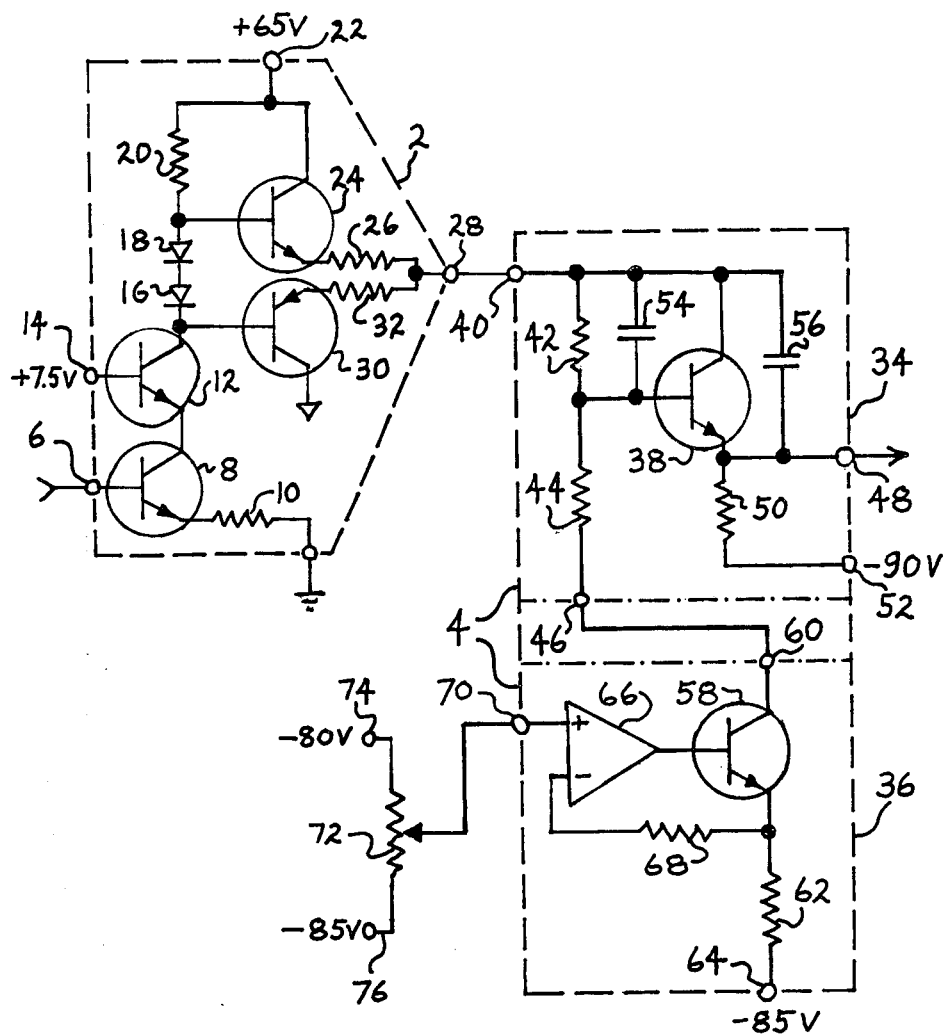
FIG. 1 shows the schematic diagram of the level-shifting circuit of this invention implemented in combination with a cascode complementary video output amplifier.

FIG. 1 shows a cascode complementary video output amplifier 2, of known art, combined with a level-shifting circuit 4 as taught by this invention. Amplifier input terminal 6 is connected to the base of video input npn transistor 8, which has its emitter connected thru resistor 10 to common ground, and its collector connected to the emitter of an npn transistor 12 connected in a cascode configuration with its base connected to +7.5 volts at power supply terminal 14, and its collector connected thru a pair of silicon diodes 16 and 18 polarized as shown in series with load resistor 20 connected to +65 volts at power supply terminal 22. Also connected to terminal 22 is the collector of npn output transistor 24 which has its base connected to the junction of resistor 20 and the anode of diode 18, and its emitter connected thru resistor 26 to amplifier output terminal 28. A complementary pnp output transistor 30 has its emitter connected thru resistor 32 to output terminal 28, its base connected to the collector of cascode transistor 12 and its collector connected to common ground.

The amplifier 2 performs basically as a conventional common emitter amplifier with transistor 8 providing a voltage gain of 15 as determined by the ratio between the resistance values of resistor 20 and resistor 10: 330 ohms/22 ohms. Thus a 3 volt peak-to-peak video signal applied to input terminal 6 will be amplified to 45 volts peak-to-peak at output terminal 28. Cascode transistor 12 serves to minimize Miller effect capacitance in input transistor 8, and the output pair, transistors 24 and 30 function as unity gain emitter followers to provide low output impedance and to minimize loading effects on the gain pair, transistors 8 and 12. Diodes 16 and 18 serve to provide correct temperature compensated bias voltage between the bases of transistors 24 and 30.

It should be recognized that in this illustrative example, for simplicity and clarity, some auxiliary circuit details such as peaking, clamping and by-passing have been omitted as unimportant to understanding the operation of the invention.

The level-shifting circuit 4 of this invention is best described and understood as two functional blocks, a current-controlled voltage source (CCVS) 34 and a voltage-controlled current source (VCCS) 36.

In the CCVS 34, npn transistor 38 has its collector connected to signal input terminal 40 which is connected to output terminal 28 of the video output amplifier 2. The base of transistor 38 is connected to the junction of two resistors 42 and 44 whose opposite ends are connected to signal input terminal 40 and interface control terminal 46 respectively. The emitter of transistor 38 is connected to signal output terminal 48 as well as thru resistor 50 to −90 volts at power supply terminal 52. Bypass capacitor 54 is connected between the base and collector of transistor 38, and bypass capacitor 56 is connected between the collector and emitter of transistor 38.

The CCVS signal output terminal 48 provides a video signal for driving a display control element such as one of the three cathodes of a color picture tube.

In the VCCS 36, npn transistor 58 has its collector connected thru terminal 60 to CCVS control terminal 46. The emitter of transistor 58 is connected thru resistor 62 to −85 volts at power supply terminal 64, and its base is connected to the output of an integrated operational amplifier (opamp) 66 which has its inverting {−} input connected thru resistor 68 to the emitter of transistor 58 and its non-inverting {+} input connected to voltage control input terminal 70. External to the VCCS 36, potentiometer 72 has its upper end connected to −80 volts at power supply terminal 74, its rotor connected to voltage control input terminal 70 and its lower end connected to −85 volts at power supply terminal 76.

The various power supply voltages have been selected such that the cathode drive voltage required at terminal 48 will always be less positive than the video amplifier output voltage available at terminal 28 in order to ensure that transistor 38 remains biased in its active region at all times. The −85 volts applied to terminal 64 and the voltages applied to potentiometer 72 ensure that transistor 58 remains biased in its active region at all times.

The level-shifting function of the circuit operates as follows. With potentiometer 72 set at mid-range, −82.5 volts (centered between −80 and −85 volts at the ends of potentiometer 72) is applied to the {+} input of opamp 66 at terminal 70. Negative feedback to the {−} input thru resistor 68 will hold the emitter voltage of transistor 58 very close to the −82.5 volts applied to the {+} input at terminal 70, setting a control current of 2.5 milliamperes in resistor 62, as determined by its 1 k ohm resistance and the 2.5 volt drop across it. The same 2.5 milliampere control current will flow in resistor 42 causing a 25 volt drop across its 10 k resistance. This voltage drop plus approximately 0.6 volts normal Vbe drop from the base to the emitter of transistor 38 establish an offset voltage between the video amplifier output terminal 28 and the level-shifter output terminal 48.

It should be apparent that a change in the setting of potentiometer 72 will result in a proportional change in the control current thru resistor 42 and consequently in the d.c. offset voltage between terminal 28 and terminal 48. Thus potentiometer 72 is able to indirectly control the amplitude of a d.c. offset voltage, ranging from 0 to −50 volts, superimposed on the a.c. component of the video output signal applied to the picture tube cathode. Isolation provided by 3.3 k ohm resistor 44 minimizes the effect of any high frequency loading caused by capacitance at interface control terminal 46 and the collector of transistor 58, thus avoiding any loss of bandwidth. The use of current control in this manner places the CCVS 34 in the signal path without signal degradation while the VCCS 36 remains outside of the video signal path, handling only d.c. potentials.

Figure 2:
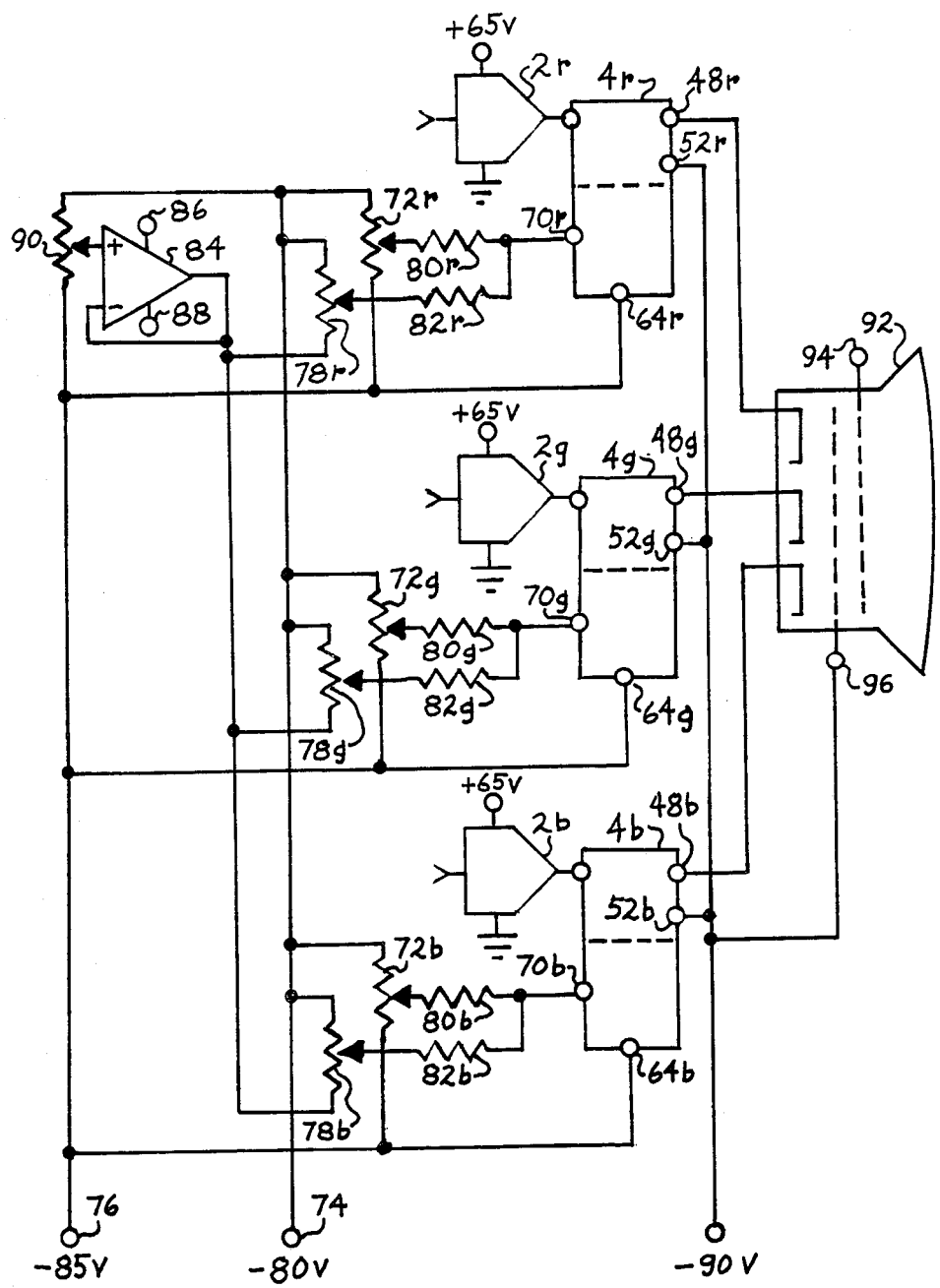
FIG. 2 shows three level-shifting circuits of this invention combined with three video output amplifiers, in block diagram form, driving a color picture tube, including the detailed circuit diagram of the d.c. control system including user brightness control and setup adjustment controls for three gun background and brightness tracking.

In FIG. 2, the amplifier 2 from FIG. 1 is shown in triplicate in block form as 2r, 2g and 2b, driving a unitized gun color picture tube 92 thru level-shifting circuits 4r, 4g and 4b in a preferred embodiment of this invention in which its advantages are particularly beneficial. Control input terminals 70r, 70g and 70b of level-shifters 4r, 4g and 4b respectively, each receive a combined voltage from two potentiometers, 72r and 78r, 72g and 78g, 72b and 78b respectively, the voltages from each pair being summed by resistors 80r and 82r, 80g and 82g, 80b and 82b respectively. All six potentiometers have their upper ends connected together in common to −80 volts at terminal 74. The lower ends of potentiometers 72r, 72g and 72b are connected in common to −85 volts at terminal 76. The lower ends of potentiometers 78r, 78g and 78b are connected in common to the output and {−} input of clamp 84, which is powered from −75 volts at terminal 86 and −90 volts at terminal 88. Opamp 84 has its {+} input connected to the rotor of potentiometer 90 which has its end terminals connected to −80 and −85 volts.

In the color picture tube 92, the G1 control grid, common to all three guns, is connected to −90 volts at terminal 96. The common G2 screen grid is connected to a voltage in the order of +400 volts at terminal 94. The G2 voltage is made adjustable within a range of approximately 300 to 800 volts to compensate for differences in cutoff from one picture tube to another.

The operation of the video amplifiers and level-shifters in FIG. 2 is the same as described for FIG. 1. Potentiometers 72r, 72g and 72b, are background setup controls for balancing the cutoff of the red, green and blue guns respectively of picture tube 92; adjustments are made at very low brightness level. Potentiometer 90 is the user brightness control which acts as a master control over the three brightness tracking setup controls, potentiometers 78r, 78g and 78b which are adjusted at minimum brightness level to balance the red, green and blue light output respectively.

Typical component values in FIG. 1 and FIG. 2 are as follows:

Resistors:
  10: 22 ohms
  20: 330 ohms
  26: 7.5 ohms
  32: 15 ohms
  42: 10 k ohms
  44: 3.3 k ohms
  50: 30 k ohms
  62: 1k ohms
  68: 47 k ohms
  80: 100 k ohms
  82: 100 k ohms
Potentiometers: all 10 k ohms
Capacitors: 54 and 56: 0.1 microfarads
Transistors:
  8: LT1001A
  12: LT1817A
  24: LT1839
  30: LT5839
  38, 58: 2N5550
IC opamps: 66, 84: MC1458

The configuration of the CCVS 34 and the VCCS 36 as illustrated in the preferred embodiment of this invention, using npn transistors, provides adjustable level shifting of negative polarity only. Alternatively, the transistors could be made pnp along with proper selection of power supply voltages to provide adjustable level shifting of positive polarity. Also, various combinations of transistors, integrated circuits and other devices may be utilized to achieve the basic functions of the level shifter circuit of this invention thru its key feature, the use of current control to interface between the CCVS and the VCCS.

These and other alternatives which may become apparent to those of skill in the art of electronic circuits without departing from the spirit of this invention are intended to be included within the scope of this disclosure.

What is claimed is:

1. For use in combination with a video amplifier for driving a display device such as a cathode ray picture tube, a dynamic level shifting circuit comprising:
    a current-controlled voltage source (CCVS) having a signal input terminal receiving a video signal from a video amplifier, a signal output terminal connected to a control element of a display device, a power supply terminal connected to a first d.c. power source, and a current control input terminal; and
    a voltage-controlled current source (VCCS) having a control voltage input terminal, a power supply terminal connected to a second d.c. power source, and a current control output terminal, connected to the current control input terminal of said CCVS.
    wherein said CCVS is enabled to develop a d.c. offset voltage between its signal input terminal and its signal output terminal, the offset voltage being made proportional to a control current applied to said CCVS at its current input terminal thru its connection to the current control output terminal of said VCCS, the control current being made proportional to a d.c. control voltage applied to the control voltage input terminal of said VCCS.
    whereby the d.c. offset voltage, proportionally controlled by the d.c. control voltage, is made to become superimposed onto the video signal received by the CCVS to provide a level-shifted replica of the video signal for application to the control element of the display device.
    whereby the video amplifier, being thus relieved of conventional requirements to provide reserve dynamic signal output range for level-shifting purposes, may be design-optimized for wider bandwidth than was available conventionally.

2. The invention as defined in claim 1 wherein said CCVS comprises a transistor having a collector connected to said signal input terminal, an emitter connected to said signal output terminal, a base connected thru a first resistor to said interface control input terminal, a second resistor connected between the base and the collector, and a third resistor connected between the emitter and the power supply terminal.

3. The invention as defined in claim 2 further comprising a first by-pass capacitor connected between the collector and the base, and a second by-pass capacitor connected between the collector and the emitter.

4. The invention as defined in claim 1 wherein said VCCS comprises:
    a transistor having a collector connected to the interface control output terminal, an emitter connected thru a resistor to said second d.c. power source, and a base, and
    an integrated operational amplifier having an output terminal connected to the base of said transistor, an inverting input connected thru a resistor to the emitter of said transistor, and a non-inverting input connected to the control voltage input terminal.

5. In a color video display system having a tricolor cathode ray picture tube biased to receive video drive thru three cathodes, a d.c. level-shifting system, in combination with three video output amplifiers, for providing picture tube cutoff compensation and brightness control independent of the operating bias conditions of the video output amplifiers thus allowing the amplifiers to be design-optimized for maximum bandwidth to achieve ultra high display resolution, comprising:

three identical level-shifting circuits each having a video input terminal, a control terminal, and an output terminal connected to one of the three picture tube cathodes, three identical video output amplifier circuits, each having an input terminal for receiving low level video signals and an output terminal connected to the video input terminal of one of the three level-shifting circuits, the level-shifting circuits comprising current control means for translating a d.c. voltage applied to each of said control terminals into a proportional voltage offset between each of said video amplifier output terminals and a corresponding cathode in said picture tube.

6. The invention as in claim 5 further comprising three background adjustment potentiometers each having a first end terminal connected to a reference voltage buss, a rotor terminal connected thru one of three isolation resistors to the control terminal of one of the three level-shifting circuits, and a second end terminal connected to a voltage supply, common to the three, which is offset from the reference voltage, three brightness tracking adjustment potentiometers each having a first end terminal connected to the reference voltage buss, a rotor terminal connected thru one of three isolation resistors to the control terminal of one of the three level-shifting circuits, and a second end terminal connected to a brightness control voltage buss, common to the three, a unity gain amplifier having an input terminal and having an output terminal connected to said brightness control voltage buss, and a user brightness control potentiometer having a first end terminal connected to the reference voltage buss, a second end terminal connected to a supply voltage which is offset from the reference voltage, and a rotor terminal connected to the input terminal of said unity gain buffer amplifier, whereby said background adjustment potentiometers and said brightness tracking potentiometers are enabled to adjust the level of corresponding d.c. voltages developed between said video amplifier output terminals and said picture tube cathodes for compensating the drive to each of the cathodes for differences in their cutoff and transfer characteristics, and whereby said user brightness potentiometer is enabled to adjust overall brightness of the picture tube display, and whereby none of these adjustments is allowed to affect the operating voltage bias conditions of the video output amplifier circuits, thus said video amplifier output circuits may be designed and optimized for maximum bandwidth without having to provide reserve dynamic output capability for picture tube cutoff compensation and brightness control as in conventional color video output circuits, thereby this invention permits the achievement of greater display resolution than conventionally available.

* * * * *